Oct. 8, 1963   M. R. McKELLAR   3,106,263
ENGINE WITH SIDE RESERVOIR OIL PAN
Filed July 11, 1961
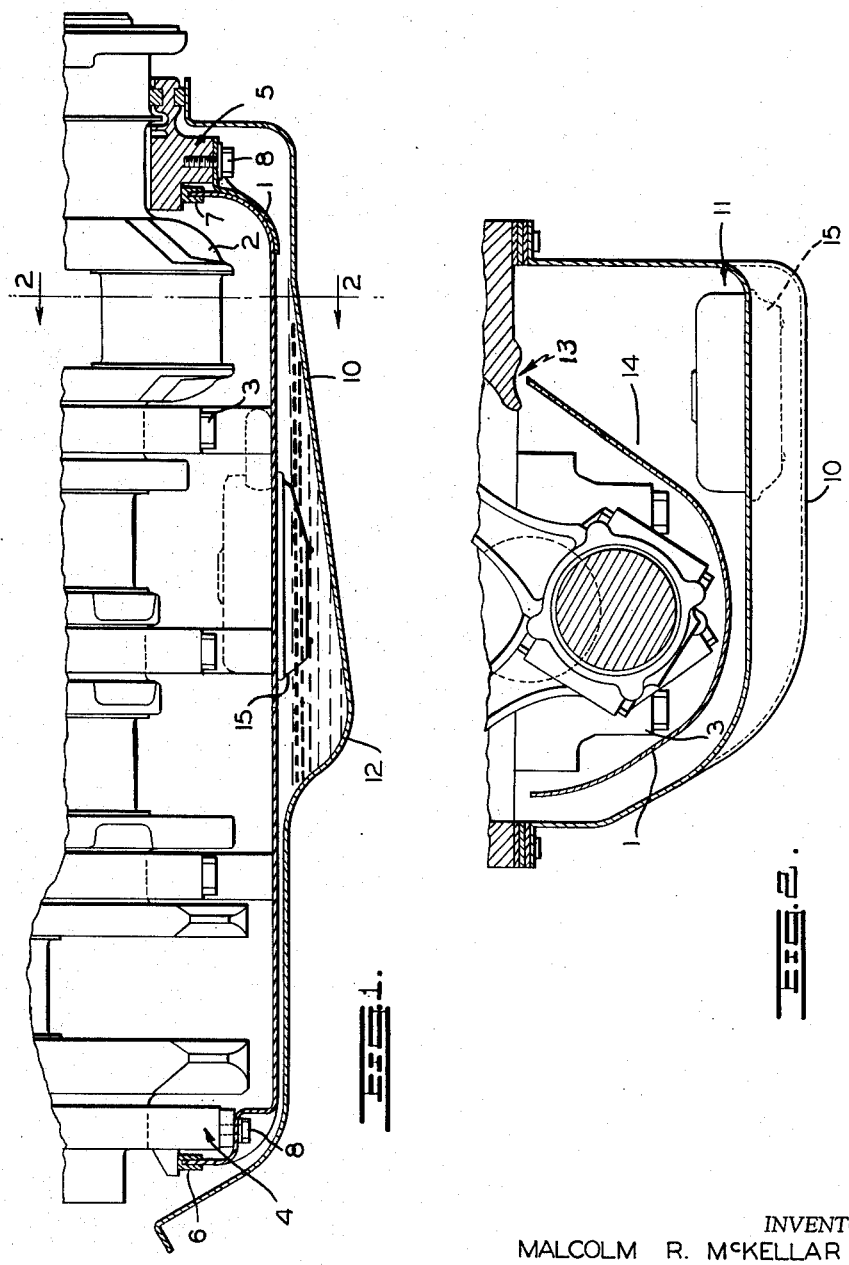
INVENTOR
MALCOLM R. McKELLAR
BY
ATTORNEY

United States Patent Office 3,106,263
Patented Oct. 8, 1963

3,106,263
ENGINE WITH SIDE RESERVOIR OIL PAN
Malcolm R. McKellar, Pontiac, Mich., assignor to General Motors Corporation, Detroit, Mich., a corporation of Delaware
Filed July 11, 1961, Ser. No. 123,241
4 Claims. (Cl. 184—106)

This invention relates to a side reservoir oil pan for use on an engine and more particularly to the application and manner of sealing the oil pan inner seal to completely surround the counterweights and connecting rods below the centerline of the crankshaft, so that the main oil reservoir is placed on the side of the rotating parts.

In the conventional engine with the oil reservoir under the crankshaft the engine depth is necessarily determined or limited by the requirements of the oil sump. This has resulted in comparatively high hood height, despite the modern trend to lower the over-all body height of automobiles.

It is an object of this invention to eliminate the flywheel at the rear end of the crankshaft, so that the conventional oil sump below the crankshaft of the engine may be omitted.

Another object is to determine the depth of an engine to any degree compatible with the requirements of the rotating parts of the engine rather than by the extra depth requirement when using the conventional oil sump.

Another object is to lower the engine height by several inches and thus the hood height. Besides permitting a minimum hood height not possible in present engines with the oil sump under the engine, our design will permit a lower center of gravity resulting in better road stability.

Still another object of the invention is to prevent excessive foaming of the oil which is splashed or thown out of the inner seal into the main reservoir on the side of the rotating parts.

The above and other objects may be attained by employing this invention which embodies among its features a manner of sealing the oil pan inner seal to completely surround the crankshaft counterweights and connecting rods in the area below the centerline of the crankshaft, so that the main oil reservoir is placed on the side of the rotating parts instead of underneath. The engine's rotating parts throw or splash the oil out of the inner seal into the side reservoir.

In the drawings:

FIGURE 1 is a side view of a conventional automotive engine employing the present invention which includes a side reservoir oil pan and an inner seal or shell for surrounding the rotating parts of the engine.

FIGURE 2 is a transverse view taken along lines 2—2 of FIGURE 1.

In FIGURES 1 and 2 it will be seen that the oil pan inner seal or shell 1 of metal surrounds the lower portion of the crankshaft counterweights 2 and the connecting rod bearing caps 3. The inner shell 1 is sealed to the front and rear main bearing caps 4 and 5, or other appropriate part of the engine structure by using synthetic rubber seals 6 and 7. Attaching bolts 8 are used to secure the inner shell 1 to the engine structure.

The cylinder block pan rail is widened over conventional designs to permit sealing the outer oil pan 10 to the cylinder block in the usual manner. The outer oil pan 10 is formed to define a side reservoir 11 for the retention of oil therein and may be considered as an outer seal or shell which encloses the inner seal or shell 1. The outer oil pan or shell 10 can be formed with a slight depression 12 in the bottom of the pan for use with engines installed at an angle of about 5°. This depression can be substantially eliminated if the crankshaft is mounted in a horizontal position within the vehicle.

In FIGURE 2 it will be seen that an oil deflecting rib 13 is formed as part of the cylinder block just above the side 14 which defines the inner shell portion of the side reservoir 11 for the engine oil. An oil pump, as in conventional designs would be included in the oil reservoir, but is not shown. An oil pickup screen 15 is positioned in the side reservoir near the longitudinal center of the engine.

The end sealing of the inner shell 1 and its close conformity to the rotating parts of the engine crankshaft permits raising the oil height to a high enough level that an oil reservoir 11 can be placed at one side of the crankshaft. The rotating parts of the crankshaft, namely, the crankarms and their counterweights maintain the reservoir 11 at sufficient capacity by throwing or splashing oil out of the inner shell into the side reservoir without excessive foaming. Excessive foaming is prevented by the particular shape of the inner shell with two upwardly extending sides and both ends sealed to the front and rear main bearings. The deflecting rib 13 serves to direct the splashed oil from the crankshaft into the reservoir 11.

The construction shown permits lowering of the engine in the chassis and permits minimum hood height. It permits even shallower oil pans than are used with conventional dry sump engines which require a collecting depression from which the oil is pumped into the oil reservoir.

From the above it will be seen that a novel lubricating arrangement is provided wherein the oil pump, oil pickup screen, and oil sump are located to one side of the crankshaft, the pump shaft being located to substantially clear the latter, and the inner shell is bolted to the main bearing caps with its upper extremities sealed at both ends to the bearing cap surfaces in a manner that allows the sides of the inner shell to extend upward to dam the oil around the crankshaft.

What is claimed is:
1. In an internal combustion engine having front and rear main bearing caps and a crankshaft having crankarms, crankarm counterweights and connecting rod bearing caps, the improvement comprising an inner oil shell surrounding the counterweights and connecting rods in the area below the centerline of said crankshaft, said inner shell having two longitudinal arcuate sides and upturned ends at its longitudinal extremities, said upturned ends being sealingly mounted to the front and rear main bearings, an outer oil shell sealingly secured to the engine, said outer shell enclosing said inner shell and conforming to one arcuate longitudinal side and the upturned extremities of said inner shell, said outer shell extending out beyond the now conforming longitudinal side to form a side oil reservoir, a deflecting rib formed as part of the engine block and being integral with the engine between said crankshaft and said reservoir, and a cup-shaped oil pickup screen mounted in said side oil reservoir, said deflecting rib being adapted to guide and direct oil thrown by crankshaft rotation into said reservoir.

2. In a lubricating system for an internal combustion engine having inner and outer oil retaining shells, said inner shell and said outer shell forming a side reservoir for oil, a crankshaft having rotating parts, said inner shell disposed to surround the rotating parts of the crankshaft and being spaced away from said engine along at least one of its longitudinal sides to permit oil to be splashed into the side reservoir by rotation of the crankshaft.

3. In an internal combustion engine having a cylinder block, crankshaft, a side reservoir for oil, the improvement comprising a seal means, an outer shell defining said reservoir and surrounding said seal means for raising the oil height of the engine, said seal means comprising an inner shell disposed around the crankshaft and connected to the engine structure, said inner shell being disposed away from the engine structure along its longitudinal sides and above the oil level, and means between the oil reservoir and said inner shell for directing oil thrown by the crankshaft into the side oil reservoir.

4. The arrangement as defined in claim 3, wherein said outer shell is formed with a depression serving as a storage means for lubricant when the engine is not substantially horizontal.

References Cited in the file of this patent

UNITED STATES PATENTS

| | | |
|---|---|---|
| 1,096,550 | Maranville | May 12, 1914 |
| 1,278,655 | Holliday | Sept. 10, 1918 |
| 2,983,334 | Dalrymple | May 9, 1961 |